United States Patent [19]

Hojo et al.

[11] Patent Number: 5,210,998

[45] Date of Patent: May 18, 1993

[54] LAWN MOWER WITH DETACHABLE INNER MEMBERS IN CUTTER HOUSING

[75] Inventors: Hiroshi Hojo; Yasuhiro Sugimoto; Kazuhiro Sakamoto; Masanori Takeishi, all of Saitama; Dai Koumoto, Okayama; Akira Amano; Yasuji Hashimoto, both of Saitama, all of Japan

[73] Assignee: Honda Giken Kogyo Kabushiki Kaisha, Tokyo, Japan

[21] Appl. No.: 822,739

[22] Filed: Jan. 21, 1992

[30] Foreign Application Priority Data

Jan. 18, 1991 [JP] Japan .................. 3-018389
Jan. 18, 1991 [JP] Japan .................. 3-018390

[51] Int. Cl.$^5$ .................. A01D 35/73; A01D 35/82
[52] U.S. Cl. .................. 56/255; 56/295; 56/320.1
[58] Field of Search .............. 56/13.4, 255, 295, 320.1, 56/320.2

[56] References Cited

U.S. PATENT DOCUMENTS

| | | | |
|---|---|---|---|
| 2,836,024 | 5/1958 | Davis et al. | 56/13.7 |
| 3,085,386 | 4/1963 | Slemmons | 56/13.4 |
| 3,118,267 | 1/1964 | Shaw | 56/17.5 |
| 3,132,457 | 5/1964 | Slemmons | 56/202 |
| 3,220,170 | 11/1965 | Smith et al. | 56/255 |
| 3,910,017 | 10/1975 | Thorud et al. | 56/295 |
| 4,149,358 | 4/1979 | Comer | 56/295 X |
| 4,158,279 | 6/1979 | Jackson | 56/202 |
| 4,189,903 | 2/1980 | Jackson et al. | 56/255 |
| 4,205,512 | 6/1980 | Thorud | 56/13.4 |
| 4,312,174 | 1/1982 | Vanderhoef | 56/255 X |
| 4,318,268 | 3/1982 | Szymanis | 56/255 |
| 4,435,949 | 3/1984 | Heismann | 56/255 X |
| 5,094,065 | 3/1999 | Azbell | 56/255 |

FOREIGN PATENT DOCUMENTS 172855 12/1979 Japan .
98432 6/1986 Japan .
136834 8/1986 Japan .

Primary Examiner—David J. Bagnell
Attorney, Agent, or Firm—Howard L. Rose

[57] ABSTRACT

A lawn mower has a cutter blade rotatable in a substantially horizontal plane, and a cutter housing with the cutter blade being rotatably accommodated therein, the cutter housing comprising an upper wall having a raised scroll, and a circumferential wall having a discharge duct contiguous to the scroll and defining a discharge port. A first inner member is detachably disposed along inner surfaces of the upper and circumferential walls of the cutter housing, the first inner member having an inner surface of arcuate cross section. A second inner member is detachably disposed in the discharge duct contiguously to the first inner member in closing relationship to the discharge port, the second inner member being separate from the first inner member and having an inner surface of arcuate cross section.

14 Claims, 6 Drawing Sheets

LAWN MOWER WITH DETACHABLE INNER MEMBERS IN CUTTER HOUSING

BACKGROUND OF THE INVENTION

1. Field of the Invention

The present invention relates to a lawn mower, and more particularly to a powered lawn mower having a cutter blade rotatable in a substantially horizontal plane and a cutter housing which accommodates the cutter blade therein.

2. Description of the Prior Art

One known lawn mower, disclosed in U.S. Pat. No. 3,132,457, has a cutter housing which accommodates therein a cutter blade rotatable in a substantially horizontal plane. The cutter housing is partly defined by a circumferential wall that has a discharge duct defining a discharge port. U.S. Pat. No. 4,189,903 also shows a lawn mower having a cutter housing partly defined by an upper wall having a raised scroll extending fully along its entire circumference, the scroll having a discharge port. An annular inner member for closing the discharge port is detachably mounted in the scroll. When the inner member is mounted in the scroll, the cutter housing is fully closed along its circumferential wall, and grass can be cut into small clippings by a cutter blade housed in the cutter housing.

To use the cutter housing disclosed in U.S. Pat. No. 3,132,457 as a circumferentially fully closed cutter housing, it is possible to attach the annular inner member for closing the discharge pot so that grass can be cut into small clippings, as shown in U.S. Pat. No. 4,189,903. With the known cutter housing having a discharge port, generally, grass clippings are discharged laterally out of the cutter housing through the discharge port, or stored in a grass bag connected through a chute to the discharger port. It is preferable that grass clippings be further cut into smaller clippings before being discharged out of the cutter housing. In the case where the annular inner member disclosed in U.S. Pat. No. 4,189,903 is simply attached to the cutter housing, however, since the discharge port is closed by the annular inner member, it is impossible to further cut grass clippings into smaller clippings and discharge them out of the cutter housing.

U.S. Pat. No. 4,158,279 shows a cutter blade having cutting edges along its longitudinal marginal edges and air impellers disposed behind the cutting edges with respect to the direction in which the cutter blade rotates. The air impellers serve to generate air flows upwardly.

U.S. Pat. No. 4,189,903 also discloses a cutter blade having a cutting edge extending from an end thereof toward an intermediate portion near the center of rotation of the cutter blade. The cutter blade also has an air impeller disposed behind the cutting edge at the end of the cutter blade, and a lowering member on the intermediate portion for directing an air flow downwardly.

To cut grass clippings into smaller clippings, the air impeller at the end of the cutter blade for generating an upward air flow may be inclined toward the center of rotation of the cutter blade. If such an inclined air impeller were incorporated in the cutter blade with the lowering member disposed on the intermediate portion parallel to the cutting edge as disclosed in U.S. Pat. No. 4,189,903, then grass clippings would tend to flow upwardly due to the air flow produced by the air impeller inclined toward the center of rotation, and then drop onto the cutting edge on the intermediate portion of the cutting blade. However, a downwardly air flow produced by the lowering member parallel to the cutting edge would flow toward the end of the cutter blade under centrifugal forces, disturbing the air flow produced by the air impeller. Therefore, the grass clippings could not well be cut into small clippings, and could not well be distributed over the lawn.

SUMMARY OF THE INVENTION

In view of the aforesaid problems of the conventional lawn mowers, it is an object of the present invention to provide a lawn mower having a cutter housing with a discharge duct defining a discharge port, a cutter blade rotatable in a substantially horizontal plane and housed in the cutter housing, and specially designed inner members disposed in the cutter housing for causing the cutter blade to cut grass clippings into smaller clippings, the discharge duct and port being openable as desired even with the inner members disposed in the cutter housing so that the smaller grass clippings can be discharged laterally out of the cutter housing through the discharge duct and port.

Another object of the present invention is to provide a lawn mower having a cutter housing and a cutter blade horizontally rotatably housed therein, the cutter blade being operable in effective coaction with the cutter housing to direct upwardly grass clippings cut by a cutting edge on an intermediate portion of the cutter blade and then to drop the grass clippings onto the cutting edge for thereby allowing the cutter blade to cut the grass clippings into small clippings, so that the smaller grass clippings can uniformly be scattered toward the center of rotation of the cutter blade.

According to the present invention, there is provided a lawn mower comprising a cutter blade rotatable in a substantially horizontal plane, a cutter housing, the cutter blade being rotatably accommodated in the cutter housing, the cutter housing comprising an upper wall having a raised scroll, and a circumferential wall having a discharge duct contiguous to the scroll and defining a discharge port, a first inner member detachably disposed along inner surfaces of the upper and circumferential walls of the cutter housing, the first inner member having an inner surface of arcuate cross section, and a second inner member detachably disposed in the discharge duct contiguously to the first inner member in closing relationship to the discharge port, the second inner member being separate from the first inner member and having an inner surface of arcuate cross section.

At least the first inner member has at least one guide rib on the inner surface thereof for guiding grass clippings cut off by the cutter blade in a direction upwardly and radially inwardly in the cutter housing, The cutter blade comprises an elongate cutter blade member, a cutting edge extending along a marginal edge of the cutter blade member from an end thereof toward an intermediate portion thereof near a center of rotation thereof, an air impeller for producing upward air flows, the air impeller being disposed on the end of the cutter blade member behind the cutting edge in a direction in which the cutter blade rotates, and a lowering member for directing air flows downwardly, the lowering member being disposed on the intermediate portion more closely to the center of rotation than to the air impeller, the air impeller being inclined toward the center of rotation, the lowering member having a surface facing in the direction and inclined toward the center of rotation.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
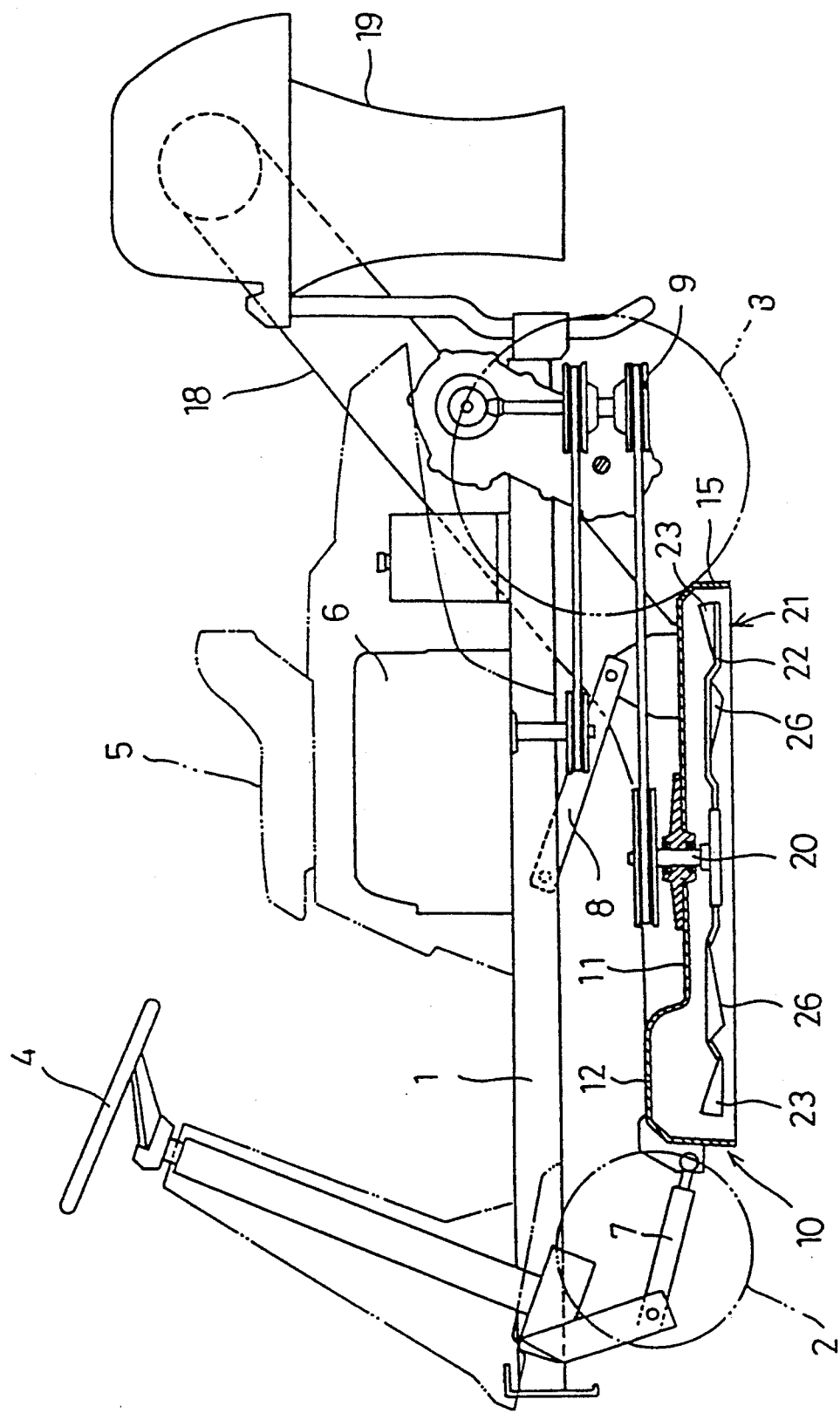
FIG. 1 is a schematic side elevational view of a powered lawn mower according to the present invention.
Figure 2:
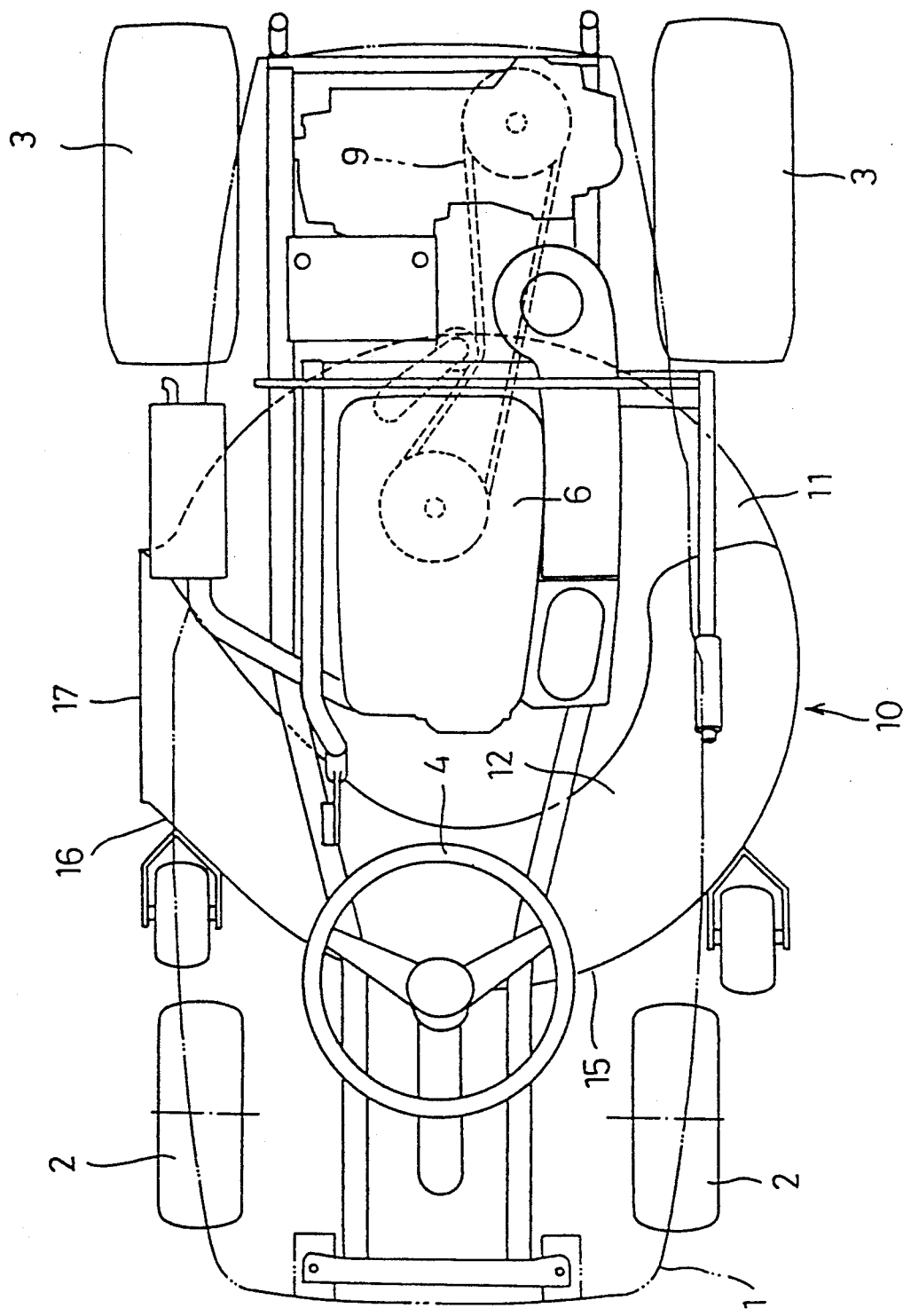
FIG. 2 is a plan view of the powered lawn mower shown in FIG. 1.

FIGS. 1 and 2 schematically show a powered lawn mower according to the present invention. As shown in FIGS. 1 and 2, the powered lawn mower basically comprises a frame 1, a pair of front wheels 2, a pair of rear wheels 3, a steering wheel 4, a driver's seat 5, an engine 6, a cutter housing 10, and a cutter blade 21 for cutting off grass. The cutter housing 10 is mounted on the frame 1 through front and rear links 7, 8, and positioned beneath a substantially central portion of the frame 1. The cutter housing 10 accommodates therein an elongate cutter blade 21 mounted on the lower end of a central vertical shaft 20 that is rotatably supported on an upper wall 11 of the cutter housing 10. Rotative power generated by the engine 6 is transmitted through a belt and pulley mechanism 9 to the central vertical shaft 20 to rotate the cutter blade 21 in a substantially horizontal plane.

Figure 3:
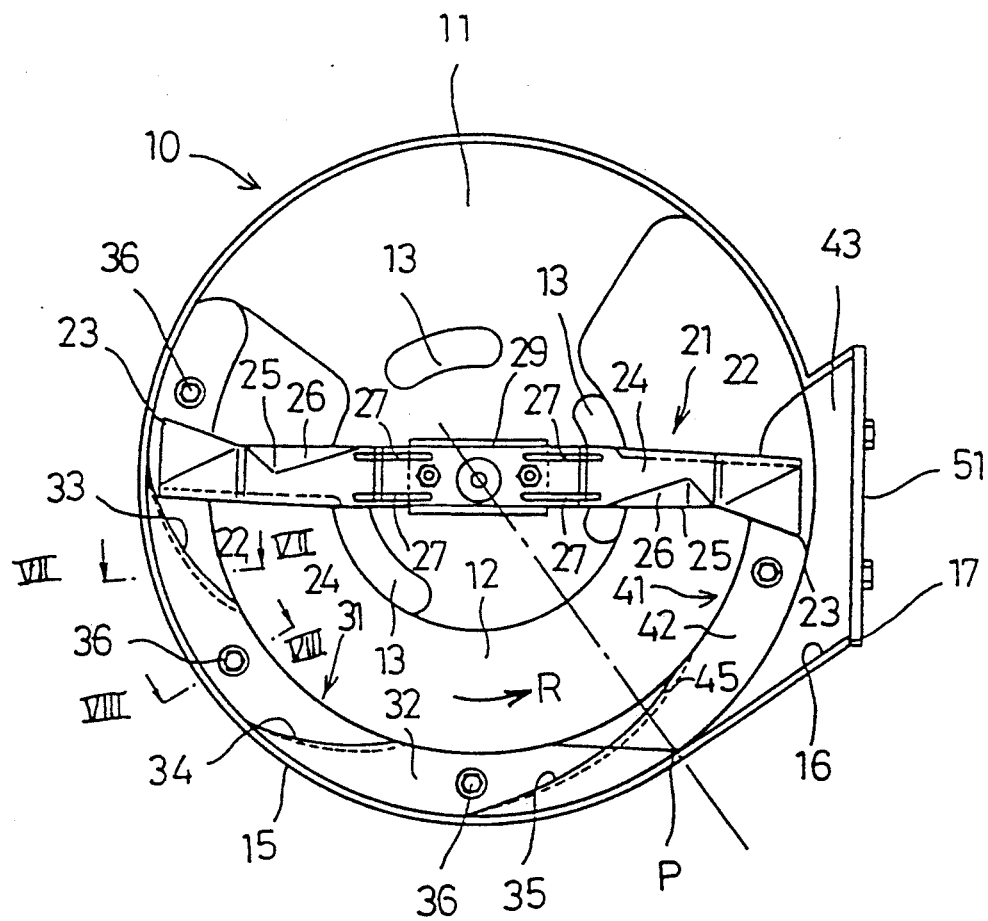
FIG. 3 is a bottom view showing the interior of a cutter housing of the powered lawn mower.
Figure 4:
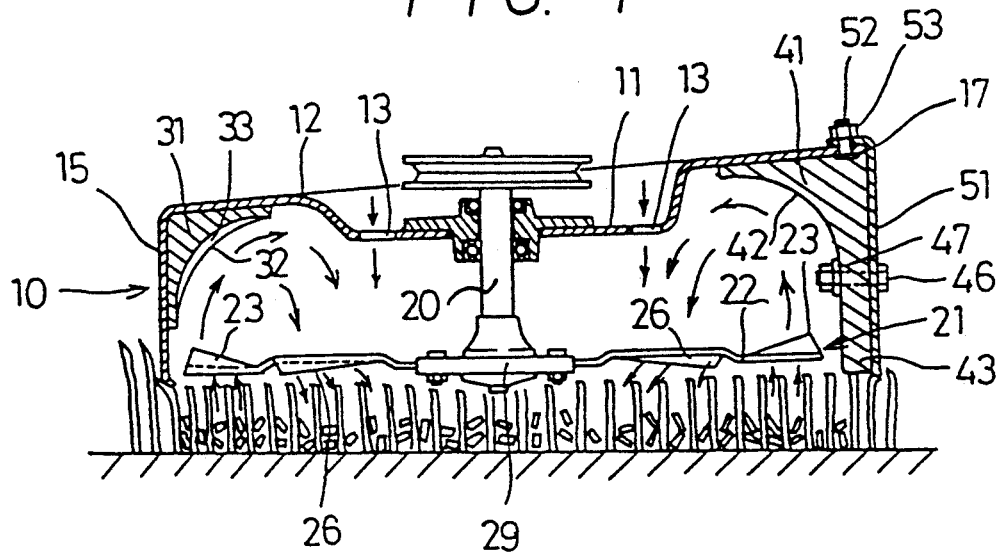
FIG. 4 is a vertical cross-sectional view of the cutter housing.

As also shown in FIGS. 3 and 4, the cutter housing 10 has an open lower end and is of a substantially circular shape as viewed in plan. The upper wall 11 of the cutter housing 10 has an upwardly raised scroll 12 except a rear portion thereof in the longitudinal direction of the frame 1. The cutter housing 10 has an annular circumferential wall 15 having a discharge duct 16 projecting laterally outwardly therefrom and defining a discharge port 17. The upper wall 11 also has three arcuate air inlets 13 defined in a central portion thereof around the central shaft 20.

The scroll 12 is progressively higher (see FIG. 4) in the direction R (see FIG. 3) in which the cutter blade 21 rotates, for increasing the rate of air flow toward the discharge duct 16. The discharge duct 16 is tangentially joined to the scroll 12 at a point P (FIG. 3) on the circumferential wall 15 of the cutter housing 10. As shown in FIG. 1, a grass bag 19 disposed behind the frame 1 is connected to the discharge port 17 through a chute 18.

Figure 9:
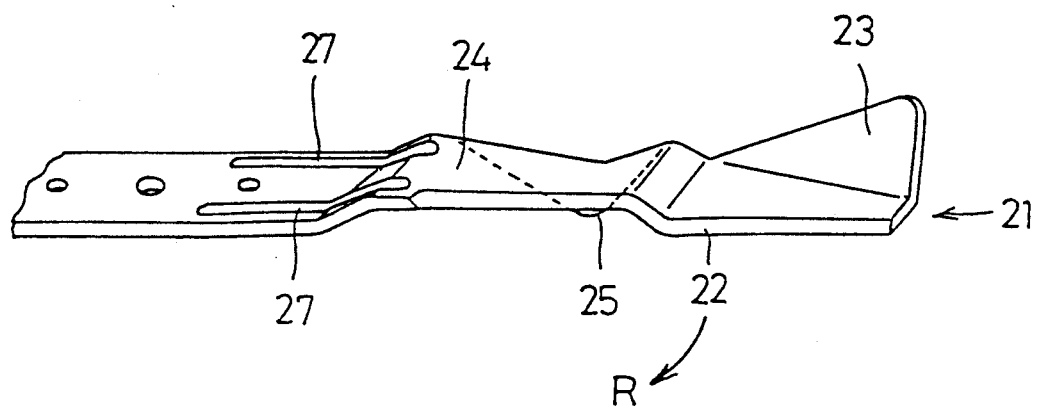
FIG. 9 is an enlarged fragmentary perspective view of a cutter blade to be rotatably housed in the cutter housing.
Figure 10:
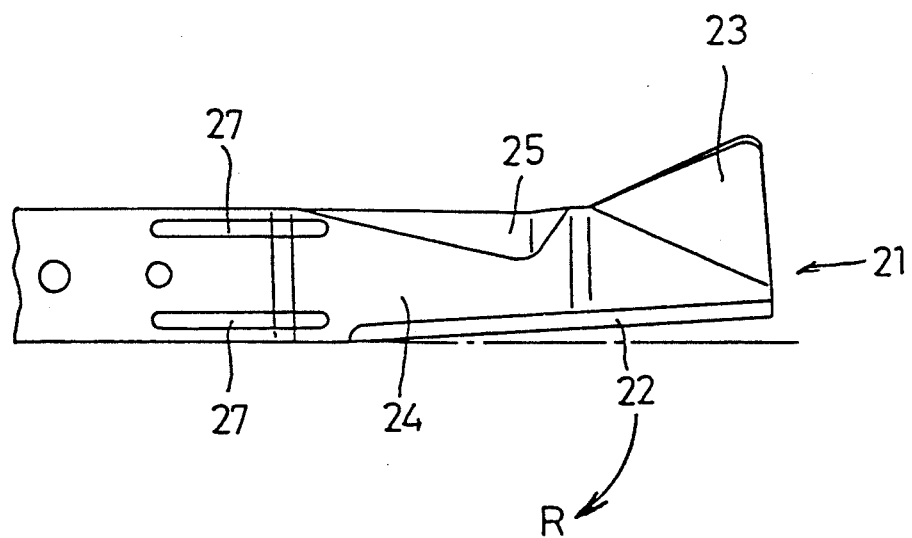
FIG. 10 is a fragmentary plan view of the cutter blade shown in FIG. 9.

As also shown in FIGS. 9 and 10 at enlarged scale, the cutter blade 21 has a cutting edge 22 on each of longitudinal marginal edges of blade arms thereof that are positioned one on each side of the center of rotation of the cutter blade 21. The cutter blade 21 also has an air impeller 23 in the form of an upwardly raised triangular wing at each end of the cutter blade 21 behind the cutting edge 22 in the direction R. The cutter blade 21 also includes an upwardly raised land 24 extending radially between the center of the cutter blade 21 and the air impeller 23. The upwardly raised land 24 has a substantially triangular lowering member 25 along a rear edge thereof in the direction R. The cutter blade 21 also has two spaced grooves 27 defined radially across the step between the upwardly raised land 24 and the center of rotation of the cutter blade 21, the grooves 27 being open upwardly.

Each of the cutting edges 22 extends from the radially outer end of the cutter blade 21 toward an intermediate portion thereof or the upwardly raised land 24 near the center thereof. Each of the air impellers 23 is inclined downwardly toward the center of rotation of the cutter blade 21. Each of the lowering members 25 has a relatively large surface 26 facing in the direction R and inclined toward the center of rotation of the cutter blade 21. As shown in FIG. 10, the cutting edge 22 is progressively inclined toward the end of the cutter blade 21 such that it is progressively retracted from the corresponding imaginary edge of the cutter blade 21 in a direction opposite to the direction R. The lowering member 25 has a lowermost end positioned substantially in the same level as or above the general plane of the cutter blade 21 other than the upwardly raised land 24.

FIGS. 9 and 10 only show one half of the elongate cutter blade 21. Actually, the cutter blade 21 is symmetric with respect to the center of rotation thereof, and has a cutting edge 22 and other members described above on the other half which is not shown in FIGS. 9 and 10. The center of the cutter blade 21 is mounted on the lower end of the central vertical shaft 20 through a blade holder 29 (FIGS. 3 and 4).

Figure 5:
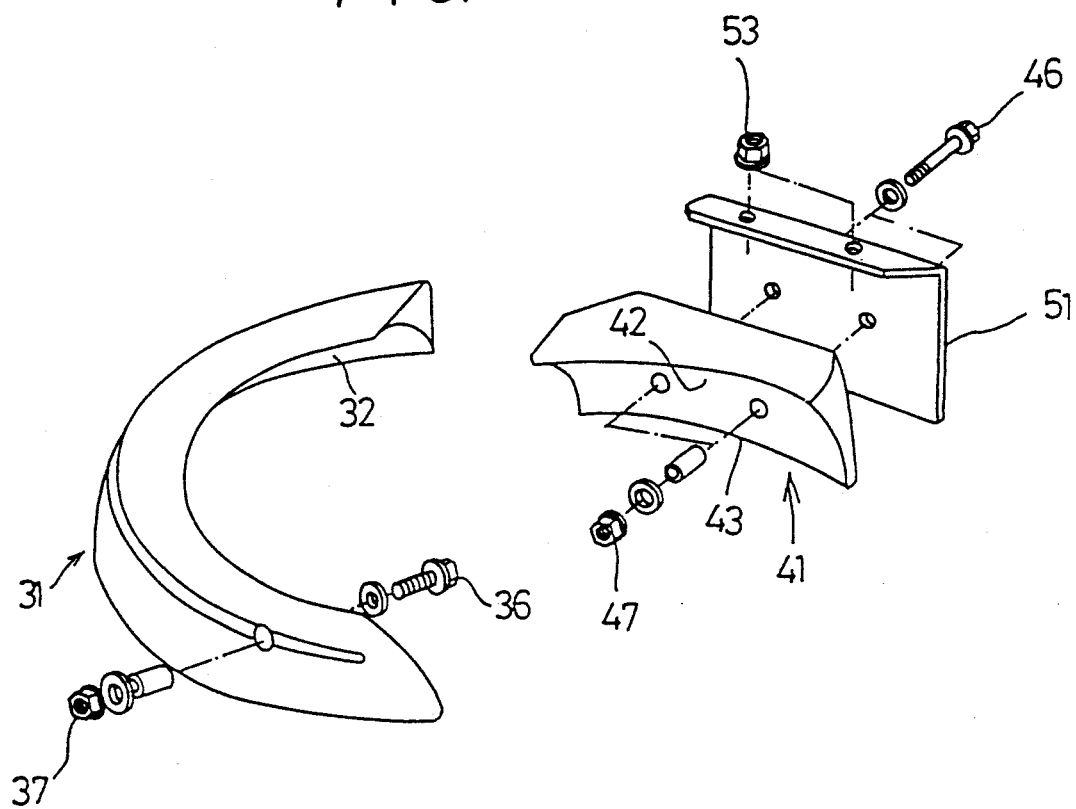
FIG. 5 is an exploded perspective view of inner members for use in the cutter housing.

As shown in FIG. 5, a first inner member 31 and a second inner member 41 which are separate from each other are detachably mounted in the cutter housing 10.

As shown in FIG. 3, the first inner member 31 in the cutter housing 10 is disposed in the scroll 12 and extends arcuately from a side region of the scroll 12 where the scroll 12 is lower to a front region thereof. The first inner member 31 has an inner surface 32 of arcuate cross section, as shown in FIG. 4. The second inner member 41 is mounted in the discharge duct 16 and has an inner surface 42 of arcuate cross section. The second inner member 41 includes a downwardly extending portion 43 closing the discharge port 17.

The first inner member 31, when installed in the scroll 12, forms a portion of the cutter housing 10. The second inner member 41, when mounted in the discharge duct 16, closes the discharge port 17. These first and second inner members 31, 41 are effective to allow the cutter housing 10 and the cutter blade 21 to perform effective mulching action, cutting and scattering grass clippings over the lawn.

Figure 6:
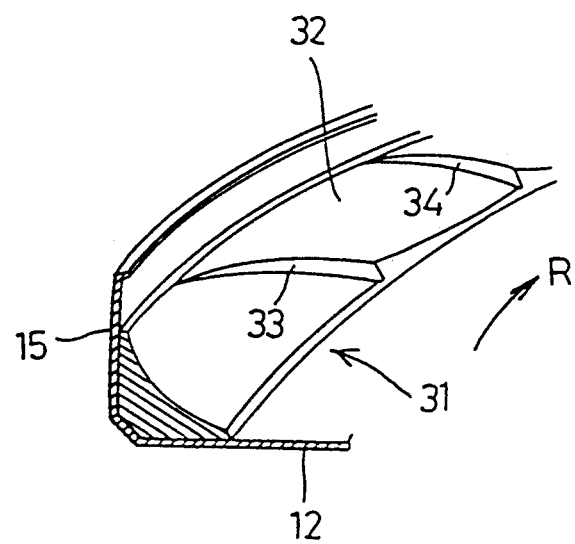
FIG. 6 is a fragmentary perspective view showing guide ribs of one of the inner members.
Figure 7:
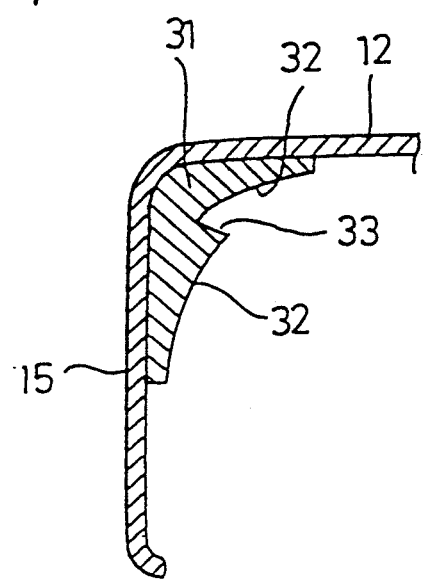
FIG. 7 is a cross-sectional view taken along line VII—VII of FIG. 3.

As best shown in FIGS. 6 and 7, the arcuate surface 32 of the first inner member 31 has a plurality of (three in the illustrated embodiment) spaced guide ribs 33, 34, 35 directed upwardly along the direction R. The arcuate surface 42 of the second inner member 41 which is contiguous to the first inner member 31 has a guide rib 45 extending continuously from the guide rib 35 of the first inner member 31, as shown in FIG. 3. These guide ribs 33, 34, 35, 45 may be inclined from their lower ends toward the upper ends as shown.

The guide ribs 33, 34, 35, 45 have surfaces facing the cutting edges 22 of the cutter blade 21. The arcuate surfaces 32, 42 have a plurality of steps defined thereon between these guide ribs 33, 34, 35, 45.

The second inner member 41 may not necessarily have the guide rib 45. Only the guide ribs 33, 34, 35 of the first inner member 31 are effective enough to cut grass clippings into smaller clippings, as described below. The first and second inner members 31, 41 may be spaced from each other.

Figure 8:
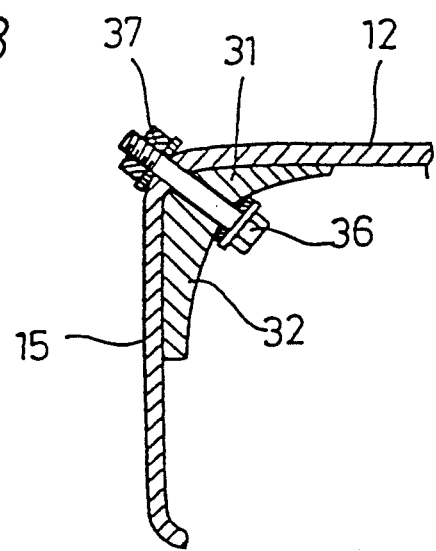
FIG. 8 is a cross-sectional view taken along line VII—VIII of FIG. 3.

Each of the first and second inner members 31, 42 is made of a synthetic resin. As best shown in FIG. 8, the first inner member 31 is held against an inner surface of the scroll 12 and an upper portion of an inner surface of the circumferential wall 15, and is fastened to the cutter housing 10 at the corner between the scroll 12 and the circumferential wall 15 by bolts 36 and nuts 37. As shown in FIGS. 3 through 5, the second inner member 41 is fitted in the discharge duct 16, and is fastened to a metallic cover 51, which is held against the outer edge of the discharge duct 16 in covering relationship to the discharge port 17, by bolts 46 and nuts 47. The metallic cover 51 has an upper flange fastened to an upper wall of the discharge duct 16 above the discharge port 17 by bolts 52 and nuts 53.

Operation of the lawn mower to cut off grass on a lawn will be described below.

In one mode of operation, as shown in FIGS. 3 and 4, both the first inner member 31 and the second inner member 41 are mounted in the cutter housing 10, fully closing the cutter housing 10 along the circumferential wall 15. Grass clippings cut off by the cutting edges 22 of the cutter blade 21 that rotates in the direction R are lifted in the cutter housing 10 by air flows produced by the air impellers 23, and move toward an upper region beneath the center of the upper wall 11 of the cutter housing 10 along the arcuate surfaces 32, 42 of the first and second inner members 31, 41, as indicated by the arrows in FIG. 4.

Since the arcuate surfaces 32, 42 have the guide ribs 33, 34, 35, 45 extending upwardly along the direction R and providing surfaces facing the cutting edges 22 of the cutter blade 21, the grass clippings are effectively moved radially inwardly into the upper region of the cutter housing 10 along the guide ribs 33, 34, 35, 45. Air drawn into the cutter housing 10 from the air inlets 13 in the upper wall 11 thereof forces the grass clippings to drop onto the path of rotation of the raised lands 24 of the cutter blade 21. The grass clippings that have fallen onto the cutter blade 21 are cut again into smaller clippings, which are then scattered uniformly toward the center of rotation of the cutter blade 21 and caused to fall onto the lawn by the inclined surfaces 26 of the lowering members 25 which are directed in the direction R and face the center of rotation of the cutter blade 21, as indicated by the arrows in FIG. 4.

Since the air impellers 23 on the opposite ends of the cutter blade 21 are inclined toward the center of the cutter blade 21, the grass clippings cut off by the cutting edges 22 are caused to flow such that they are first elevated as indicated by the arrows in FIG. 4, and then drop onto the cutting edges 22 in the raised lands 24.

The lowering members 25 are substantially triangular in shape as viewed in plan, and have the inclined surfaces 26 directed toward the center of the cutter blade 21 as with an axial-flow fan. The inclined surfaces 26 are effective to force air to flow toward the cutting edges 22 on the raised lands 24, as indicated by the arrows in FIG. 4. These air flows enhance the ability of the cutter blade 21 to cut grass clippings into smaller clippings. These smaller grass clippings can be scattered uniformly toward the center of the cutter blade 21 as indicated by the arrows in FIG. 4, and hence can fall more uniformly onto the lawn than heretofore.

As described above, the lowermost ends of the lowering members 25 are positioned substantially in the same level as or above the general plane of the cutter blade 21. Therefore, the lowering members 25 are prevented from trampling on the grass on the lawn, but are effective to produce downward air streams that enable the lawn mower to exhibit good mowing performance.

As shown in FIG. 10, each of the cutting edges 22 is progressively retracted in the direction opposite to the direction R radially outwardly. The inclined cutting edges 22 are well capable of cutting off grass sharply.

The cutter blade 21 has steps disposed between the center thereof and the raised lands 24. These steps of the cutter blade 21 serve to dampen shocks applied to the ends of the cutter blade 21 due for example to physical interference with hard objects on the lawn. Consequently, large shocks are prevented from being transmitted from the cutter blade 21 to the belt and pulley mechanism 9 and hence to the engine 6. The steps of the cutter blades 21 are relatively large in rigidity on account of the grooves 27 defined across the steps.

In another mode of operation, the first inner member 31 remains mounted in the scroll 12, and the second inner member 41 is detached from the discharge duct 16, opening the discharge port 17. In this operation mode, the arcuate surface 32 of the first inner member 31 and the guide ribs 33, 34, 35 thereof are effective to guide grass clippings, so that the grass clippings can also be cut into smaller clippings. Since the discharge port 12 is open, grass clippings can be discharged out of the cutter housing 10 through the discharge port 12 and collected in the grass bag 19 through the chute 18 (see FIG. 1).

The first inner member 31 has a terminal end extending up to the point P (see FIG. 3) on the circumferential wall 15 where the discharge duct 16 is tangentially joined to the scroll 12, but not projecting into the discharge duct 16. Thus, since the first inner member 31 does not disturb smooth air flows in the discharge duct 16, the grass clippings can be discharged through the discharge duct 16 and collected in the grass bag 19 highly smoothly.

Accordingly, grass clippings can be cut into smaller clippings while at the same time they can be discharged laterally out of the cutter housing 10 and/or collected in the grass bag 19.

If grass clippings are simply to be discharged laterally out of the cutter housing 10 and/or collected in the grass bag 19 on an increased rate of air flow, the first and second inner members 31, 41 may be removed to increase the rate of air flow through the scroll 12 of the cutter housing 10 for discharging glass clippings laterally out of the cutter housing 10 and/or collecting discharged grass clippings in the grass bag 19.

The cutter housing 10 with the inner members 31, 41 mounted in the scroll 12 is similar to the cutter housing having a substantially semicircular cross section as shown in FIG. 8 of U.S. Pat. No. 3,085,386. The lawn mower with such a cutter housing having a substantially semicircular cross section operates as a mulching mower that is effective to collect and lift grass clippings, then drop them in the central region of the cutter housing, and cut the dropped grass clippings into smaller clippings that will eventually be uniformly scattered onto the lawn.

The power lawn mower in the illustrated embodiment comprises a riding-type lawn mower. However, the present invention is also applicable to walking-type lawn mowers. Structural details of the power lawn mower according to the present invention may be changed or modified appropriately. The cutter blade according to the present invention may be incorporated in other types of lawn mower or machines for clipping grass.

With the present invention, as described above, the separate inner members are detachably disposed along the inner surfaces of the upper and circumferential walls of the cutter housing in which the cutter blade is horizontally movably mounted. The inner members include a first inner member detachably disposed in the scroll and having an arcuate inner surface, and a second inner member contiguous to the first inner member and detachably disposed in the discharge duct, the second inner member having an arcuate inner surface and closing the discharge port. When the first inner member is mounted in the scroll and the second inner member is mounted in the discharge duct, closing the discharge port, the cutter housing is fully closed along the circumferential wall for enabling the cutter blade to cut grass clippings effectively into smaller clippings. When the first inner member is mounted in the scroll and the second inner member is detached from the discharge duct, opening the discharge port, grass clippings can be cut into smaller clippings and also discharged laterally out of the cutter housing through the discharge port.

The cutter blade has, on each of its blade arms, a cutting edge extending from the radially outer end thereof toward an intermediate portion thereof near the center of rotation of the cutter blade, an air impeller directly upwardly at the end of the cutter blade behind the cutting edge in the direction in which the cutter blade rotates, for generating upward air flows, and a lowering member at the intermediate portion more closely to the center of the cutter blade than to the air impeller, for directing air flows downwardly. The upwardly directed air impeller is inclined toward the center of the cutter blade, and the lowering member has a surface facing the direction in which the cutter blade rotates, the surface being inclined toward the center of the cutter blade. Therefore, grass clippings cut off by the cutting edge are first lifted by air flows produced by the inclined air impeller, and then dropped onto the cutting edge in the intermediate portion. The inclined surface of the lowering member is effective to force air flows toward the cutting edge in the intermediate portion of the cutter blade, thus assisting the cutting edge in cutting the grass clippings into smaller clippings and uniformly scattering the grass clippings toward the center of cutter blade. Consequently, the grass clippings can be cut and dropped more uniformly onto the lawn than heretofore.

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

We claim:

1. A lawn mower comprising:
   a cutter blade rotatable in a substantially horizontal plane;
   a cutter housing, said cutter blade being rotatably accommodated in said cutter housing, said cutter housing comprising an upper wall having a raised scroll, and a circumferential wall having a discharge duct contiguous to said scroll and defining a discharge port;
   a first inner member detachably disposed along inner surfaces of the upper and circumferential walls of said cutter housing, said first inner member having an inner surface of arcuate cross section; and
   a second inner member detachably disposed in said discharge duct contiguously to said first inner member in closing relationship to said discharge port, said second inner member being separate from said first inner member and having an inner surface of arcuate cross section.

2. A lawn mower according to claim 1, wherein at least said first inner member has at least one guide rib on said inner surface thereof for guiding grass clippings cut off by said cutter blade in a direction upwardly and radially inwardly in said cutter housing, 3. A cutter blade which is rotatable in a substantially horizontal plane to cut off grass clippings, comprising:
   an elongate cutter blade member;
   a cutting edge extending along a marginal edge of the cutter blade member from an end thereof toward an intermediate portion thereof near a center of rotation thereof;
   an air impeller for producing upward air flows, said air impeller being disposed on said end of the cutter blade member behind said cutting edge in a direction in which the cutter blade rotates; and
   a lowering member for directing air flows downwardly, said lowering member being disposed on the intermediate portion more closely to said center of rotation than to said air impeller;
   said air impeller being uniformly inclined toward said center of rotation, said lowering, member having a surface facing in said direction and uniformly inclined toward said center of rotation.

4. A cutter blade according to claim 3, wherein said cutting edge is progressively retracted in a direction opposite to said direction toward said end of the cutter blade member.

5. A cutter blade according to claim 3, wherein said cutter blade member having a step disposed between said intermediate portion and said center of rotation.

6. A cutter blade according to claim 3 wherein
   said lowering member surface is both facing toward and inclined toward the center of rotation of said blade.

7. A lawn mower comprising:
   a cutter blade rotatable in a substantially horizontal plane, said cutter blade having a cutting edge extending along a marginal edge thereof from an end thereof, an air impeller for producing upward air flows, said air impeller being disposed on said end behind said cutting edge in a direction in which the cutter blade rotates, a upwardly raised land disposed on an intermediate portion of the cutter blade between said air impeller and a center of rotation of the cutter blade, and a lowering member for directing air flows downwardly, said lowering member being disposed on said land behind said cutting edge in said direction, said lowering member being of a substantially triangular shape as viewed in plan;

a cutter housing, said cutter blade being rotatably accommodated in said cutter housing, said cutter housing comprising a substantially circular upper wall having a raised scroll except a rear portion thereof in a longitudinal direction of the lawn mower, and a substantially annular circumferential wall having a discharge duct contiguous to said scroll and defining a discharge port;

a first inner member detachably disposed along inner surfaces of the upper and circumferential walls of said cutter housing, said first inner member having an inner surface of arcuate cross section; and a second inner member detachably disposed in said discharge duct contiguously to said first inner member in closing relationship to said discharge port, said second inner member being separate from said first inner member and having an inner surface of arcuate cross section.

8. A lawn mower according to claim 7, wherein said first and second inner members jointly have a plurality of guide ribs spaced from each other and extending upwardly along said direction in which the cutter blade rotates.

9. A lawn mower according to claim 7, wherein said cutting edge extends from said end of the cutter blade to said upwardly raised land, said air impeller being inclined toward said center of rotation of the cutter blade for directing upwardly grass clippings cut off by said cutting edge, said lowering member having an inclined surface directed toward said center of rotation of the cutter blade for uniformly scattering grass clippings cut off by said cutting edge toward said center of rotation, said lowering member having a lower end at substantially the same level as or above a general plane of said cutter blade other than said upwardly raised land.

10. A lawn mower according to claim 7, wherein said scroll is progressively higher toward said discharge duct.

11. A lawn mower according to claim 7, wherein said upper wall has a plurality of air inlets for introducing air into said cutter housing to force grass clippings lifted by said air impeller toward the cutting edge at said upwardly raised land.

12. A lawn mower comprising:

a cutter blade rotatable in a substantially horizontal plane;

a cutter housing, said cutter blade being rotatably accommodated in said cutter housing, said cutter housing comprising an upper wall having a raised scroll, and a circumferential wall having a discharge port contiguous to said scroll and defining a discharge port;

a first inner member detachably disposed along inner surfaces of the upper and circumferential walls of said cutter housing, said first inner member having an inner surface of arcuate cross section; and said first inner member having at least one rib on said inner surface located to guide grass clippings cut off by said cutter blade upwardly and radially inwardly of the cutter housing.

13. A lawn mower according to claim 12 further comprising:

a plurality of said ribs circumferentially spaced from one another.

14. A lawn mower according to claim 12 wherein said rib is enlarged radially inwardly.

* * * * *